INVENTOR
OLE SKRYDSTRUP
By Addams & Ferguson
ATTORNEY

United States Patent Office 3,564,431
Patented Feb. 16, 1971

3,564,431

MULTIPLE INPUT CROSSPOINT GROUP WITH COMMON OUTPUT AMPLIFIER AND INDEPENDENTLY VARIABLE SWITCHING CIRCUITS

Ole Skrydstrup, Pierrefonds, Quebec, Canada, assignor to Central Dynamics, Ltd., Montreal, Quebec, Canada
Filed Apr. 22, 1968, Ser. No. 722,870
Int. Cl. H03k 17/00
U.S. Cl. 328—154 6 Claims

ABSTRACT OF THE DISCLOSURE

A multiple input crosspoint group with common output amplifier is disclosed where at each crosspoint of the group is disposed a video switching circuit having an independently variable transfer function. Each switching circuit is controlled by its own control signal to permit or prevent the passage of a video signal applied thereto. Each switching circuit includes means to provide delay line equalization and to compensate for attendant attenuation whenever the video signal applied thereto is the output from a delay line. Each of the switching circuits is connected to a common output stage which provides an output signal corresponding to the activated switching circuit. The output from the output stage is also connected back to all of the switching circuits as a negative feedback signal. It is on this signal that the gain adjusting and equalizing circuitry operates. The switching circuitry includes a differential amplifier, one input of which is connected to its associated video signal and the other of which is connected to the amplitude adjusted and equalized negative feedback signal. The differential amplifier includes a constant current transistor which feeds both transistors of the differential amplifier. The constant current transistor is responsive to the control signal to thereby switch the switching circuit on whenever the control signal is present. Also disclosed is circuitry for insuring that whenever one of the switching circuits is on the others are turned off.

BACKGROUND OF THE INVENTION

This invention relates to a multiple input crosspoint group with a common output amplifier and independently variable switching circuits disposed at each crosspoint of the group.

In video switching systems, delay lines are used to correct for path delay through mixing amplifiers and special effects units. Typically coaxial cables are used as delay lines thus necessitating the use of cable equalizers to compensate for frequency loss in the coaxial cable. As will be described in more detail hereinafter with respect to FIGS. 1 and 2, various arrangements have been employed in the prior art to compensate for the frequency losses and attendant attenuation which result from the use of delay lines. However, all of the prior art approaches employ extra components such as equalizers, attenuators, and switching circuit output amplifiers to effectuate the desired results. This has proved to be wasteful in terms of the number of added circuits needed in the switching systems whenever video signals are routed through delay lines. Further, this tends to be wasteful because an input amplifier must be provided for each input to the switching bus or crosspoint group in the prior art systems. The expense of an input amplifier per input can be justified whenever an input is connected to many switching circuits on several busses. However, when a limited number of input video signals are connected to only one switching bus or crosspoint group, the problem becomes quite severe.

SUMMARY OF THE INVENTION

Thus, it is an object of this invention to provide an improved multiple input crosspoint group which eliminates the need for input amplifiers.

It is a further object of this invention to provide an improved multiple input crosspoint group which results in considerable savings both in space and costs.

It is a further object of this invention to provide an improved multiple input crosspoint group which eliminates the need for extra components in switching systems whenever video signals are routed through delay lines.

Other objects and advantages of this invention will become apparent upon reading the appended claims in conjunction with the following detailed description and the attached drawing.

DETAILED DESCRIPTION OF A PREFERRED EMBODIMENT OF THE INVENTION

Figure 1:
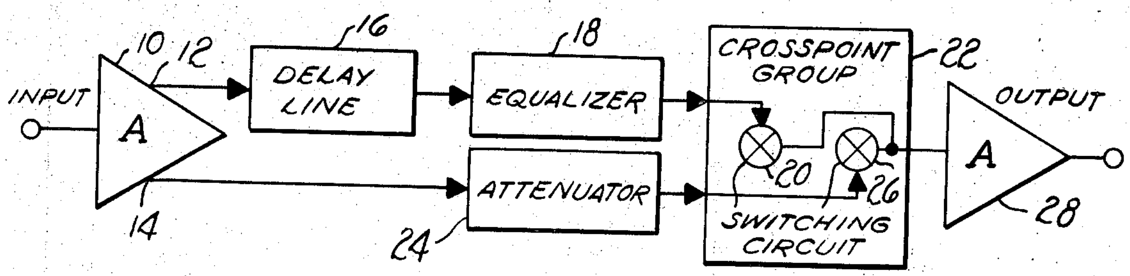
PRIOR ART FIG-1
FIGS. 1 and 2 are block diagrams of illustrative prior art switching systems for use with delay lines.
Figure 2:
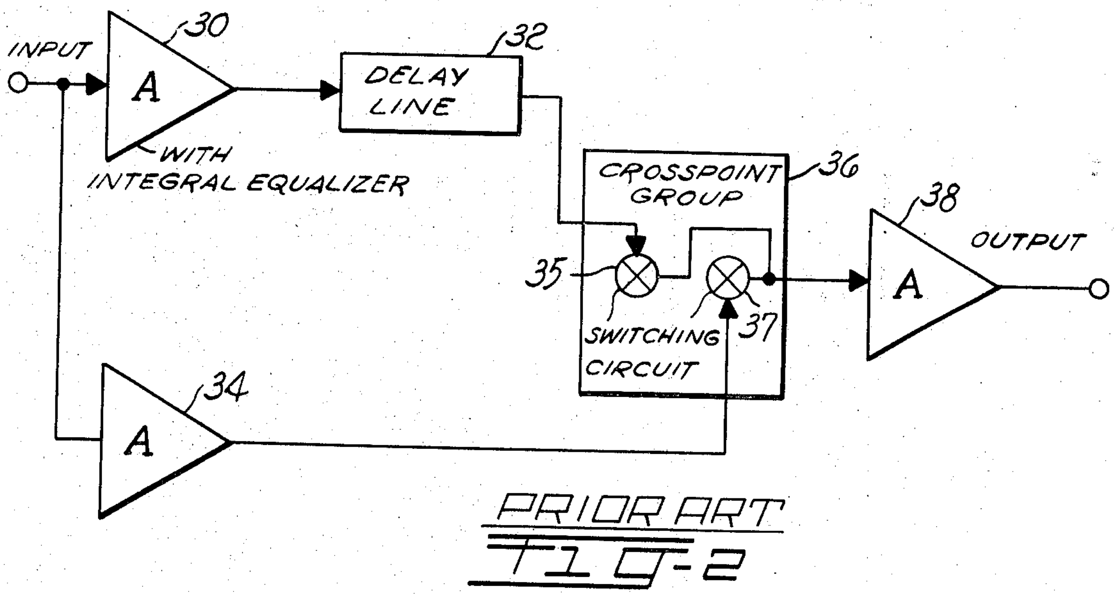
PRIOR ART FIG-2

Referring to FIGS. 1 and 2 there is illustrated in block diagram form two prior art switching systems utilizing equalizers to compensate for frequency losses caused by system delay lines and amplifying means to compensate for attendant attenuation. Thus, in FIG. 1 an input signal is applied to amplifier 10 having two identical outputs occurring at terminals 12 and 14. The output signal at terminal 12 is applied to delay line 16 and thence to equalizer 18 which compensates for the frequency loss introduced by the delay line. As stated herein before, the purpose of delay line 16 is to correct for path delay through other units of the system such as mixing amplifiers and special effects units. The output from equalizer 18 is then applied to switching circuit 20 of crosspoint group or switching bus 22.

The output signal occurring at terminal 14 of amplifier 10 is applied to attenuator 24 which introduces an attenuation equivalent to the loss in the equalizer 18. The attenuator output is then applied to the switching circuit 26 of crosspoint group 22. Depending on which of the switching circuits 20 or 26 is selected (by means not shown in FIG. 1), an appropriate output signal is applied to output amplifier 28. Note that the basic distinction between the signals respectively applied from circuits 20 and 26 is that the signal applied from circuit 20 is delayed with respect to signal applied from circuit 26.

Note that the output amplifier 28 is required so that the loss introduced by equalizer 18 or attenuator 24 may be compensated for. Typically this loss is −3 db. Thus, it can be seen that a significant amount of circuitry (equalizer 18, attenuator 24, and output amplifier 28) must be incorporated with the crosspoint group 22.

FIG. 2 also is an illustrative prior art system for effectuating the desired function described with respect to FIG. 1. Thus, either a video signal or a delayed version thereof occurs at the output terminal of the crosspoint group 36, the video signal and its delayed counterpart being respectively applied to switching circuits 35 and 37. Amplifier 30 incorporates an integral equalizer to compensate for the frequency loss introduced by delay line 32. Amplifier 34 provides the direct path signal to crosspoint switching circuit 36. Once again a separate output amplifier 38 is required.

Various further combinations of the arrangement of FIGS. 1 and 2 are possible and have been employed, however, it should be once again noted that the arrangements of FIGS. 1 and 2 and the variations thereof all result in extra components in a switching system whenever the video signals are routed through delay lines.

Figure 3:
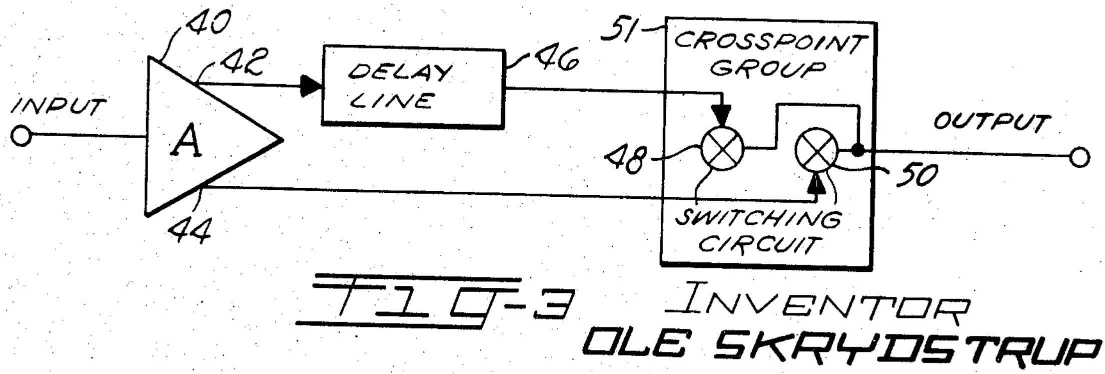
FIG. 3 is a block diagram of an illustrative embodiment of the invention.

Reference should now be made to FIG. 3 which illustrates in block diagram form the preferred embodiment of the invention. Here the input signal is applied to amplifier 40 which has identical outputs occurring at terminals 42 and 44. The terminal 42 output signal is delayed by delay line 46 and applied to crosspoint switching circuit 48 while the terminal 44 output signal is applied to crosspoint switching circuit 50 of group 51. Note that there are no extra components whatsoever. The necessary compensation for the frequency losses of the delay line and the associated attenuation is provided for within the crosspoint switching circuits 48 and 50 as will now be described.

Figure 4:
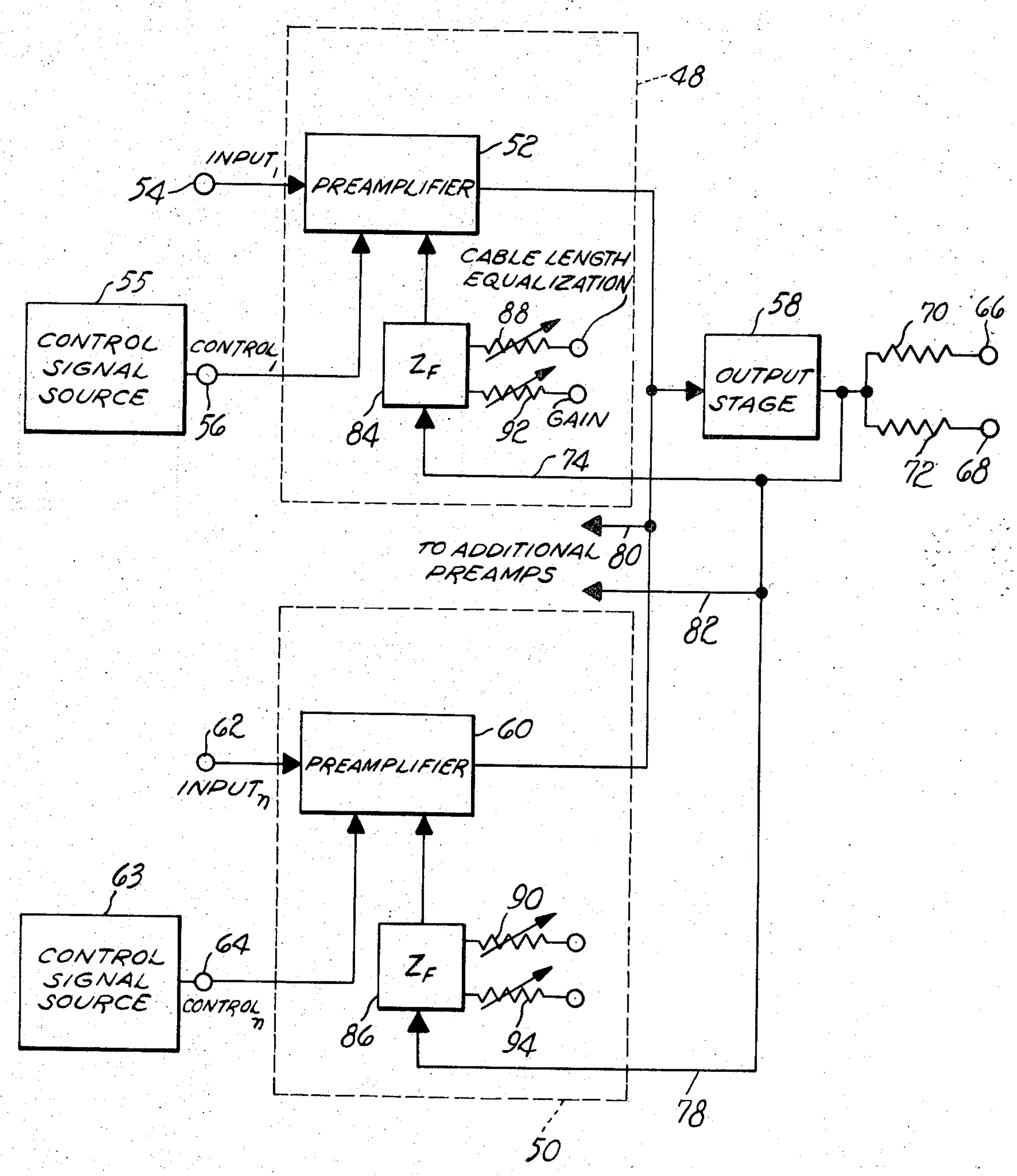
FIG. 4 is an illustrative embodiment of the crosspoint group of FIG. 3.

Referring to FIG. 4 there are shown crosspoint switching circuits 48 and 50 which respectively correspond to the first and N$^{th}$ switching circuits of crosspoint group 51 of FIG. 3. Crosspoint circuit 48 includes a preamplifier 52 to which is applied a video signal from input terminal 54, which in turn is connected to delay line 46 of FIG. 3. A control signal is applied from terminal 56, the source of the control signal being indicated at 55. The purpose of this signal is to switch the preamplifier 52 on or off and thereby respectively permit or prevent the passage of the video signal at terminal 54 to common output stage 58. The output of output stage 58 is applied as a negative feedback signal to all of the switching circuits of the crosspoint group, as will be described in more detail hereinafter.

Switching circuit 50 includes preamplifier 60 to which is connected an input video signal from input terminal 62 which in turn is connected to output terminal 44 of FIG. 3 in the example chosen. A control signal is also applied to preamplifier 60 from terminal 64, the source of the control signal being indicated at 63. The purpose of the control signal is the same as that described with respect to terminal 56 for preamplifier 52; however, of course, the control signal at terminal 64 regulates preamplifier 60 as shown in FIG. 4.

The output stage 58 has two output terminals 66 and 68. Of course, more or less output terminals may be employed. The output of stage 58 also applies negative feedback to each of the preamplifiers 52 and 60 over lines 74 and 78. As indicated in FIG. 4, feedback will also be applied to other preamplifiers of the crosspoint group over lines, such as line 82. The negative feedback signals are respectively transmitted through feedback impedance networks 84 and 86. As diagrammatically indicated in FIG. 4 each of the feedback impedance networks has means for equalizing the frequency loss introduced by delay line 46 of FIG. 3 (these means being respectively indicated at 88 and 90) and means for compensating for the attendant attenuation (these means being indicated at 92 and 94 respectively).

The operation is such that only one of the switching circuits such as 48 or 50 is energized or switched on at a particular instant of time. Thus, for example, if preamplifier 52 were switched on by an appropriate control signal at terminal 56, the video signal at terminal 54 would be passed to output stage 58 and thence to terminals 66 and 68 through resistors 70 and 72 respectively. The output signal from output stage 58 would also be applied over line 74 through adjustable, feedback impedance network 84 to compensate for the frequency loss introduced by delay line 46 and the attendant attenuation.

Figure 5:
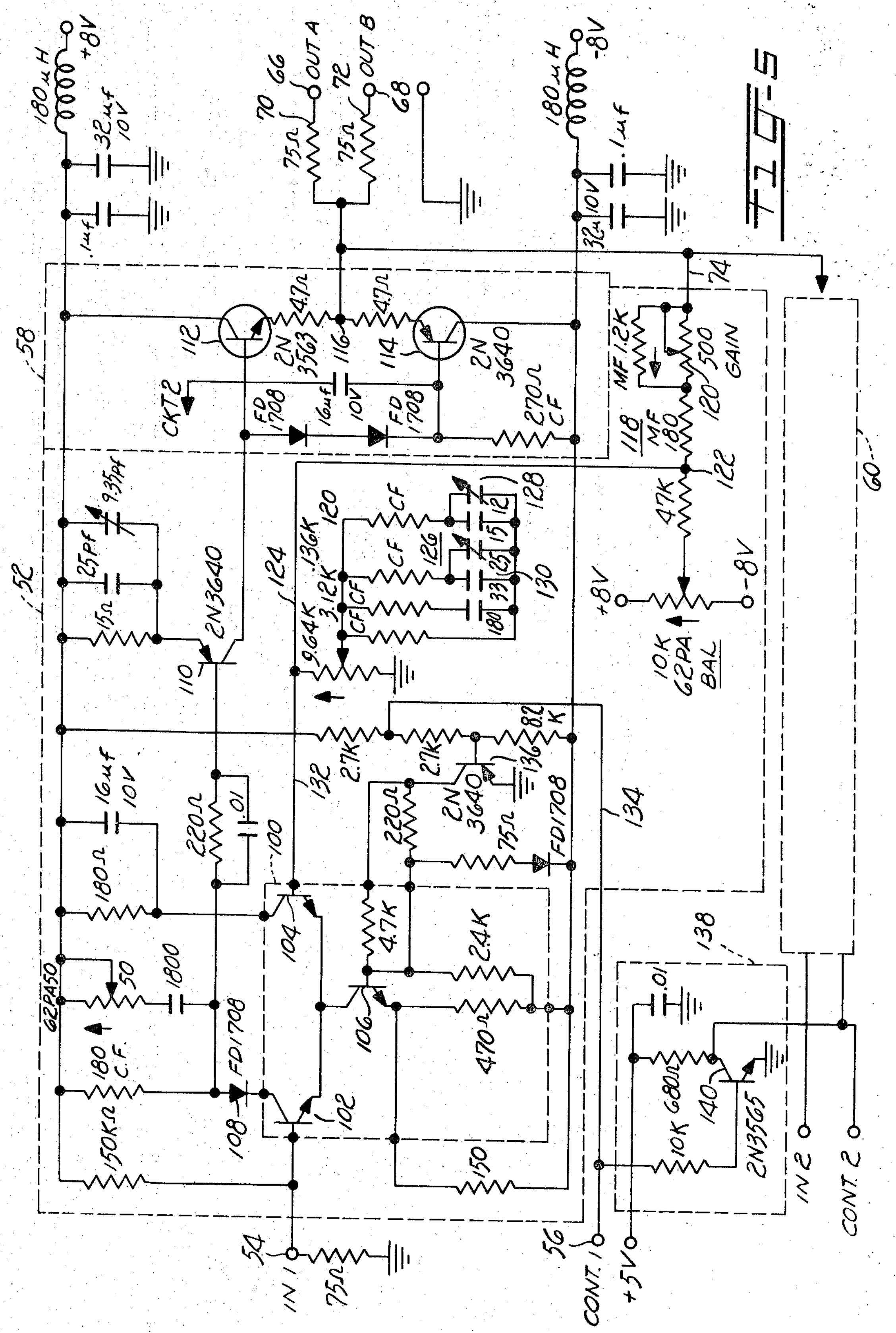
FIG. 5 is a schematic diagram of the circuitry of FIG. 4.

Reference should now be made to FIG. 5 which is an illustrative schematic diagram of the circuitry of FIG. 4. Illustrative values are shown for the various components; however, it is to be understood that these values illustrate a working embodiment of the invention and it is not intended to limit the invention to these values. The values of resistors are in ohms and capacitors in microfarads unless otherwise specified. The preamplifier 52 of FIG. 4 is shown in detail while the preamplifier 60 of FIG. 4 is diagrammatically indicated, it being understood that the circuitry employed in each preamplifier is the same.

Terminal 54 of FIG. 4, also shown in FIG. 5, is connected to a differential amplifier 100 which includes transistors 102, 104, and 106. The transistor 106 serves as a constant current source for the transistors 102 and 104. The output from differential amplifier 100 is taken from the anode of diode 108, the purpose of which is to reduce high frequency crosstalk. The output is then applied to transistor 110, the collector of which is connected to output stage 58, which is indicated by the dotted lines. This stage includes transistors 112 and 114, the output being taken from terminal 116 as indicated in FIG. 5. The output signal is then applied to terminal 66 and 68 through resistors 70 and 72, as shown in FIGS. 4 and 5. The output from output stage 58 is applied over line 74 through potentiometer network 118, the purpose of which is to adjust the gain of the differential amplifier circuit 100 and thereby compensate for attenuation introduced by delay line 46 of FIG. 3. As indicated in FIG. 5 movement of potentiometer 120 causes the gain of the preamplifier circuit 52 to change. The output from the gain control resistor network 118 is taken from terminal 122 and applied over line 124 to the delay equalizer network generally indicated at 126. The high frequency response is adjusted by controlling capacitor 128 while the low frequency response is adjusted by controlling capacitor 130. The signal is then applied over line 124 to the base of transistor 104 as negative feedback thereby substantially lowering the output impedance of output stage 58.

Preamplifier stage 52 is controlled by the presence of a control signal at terminal 56 as stated hereinbefore, this signal being transferred over line 134 to the base of transistor 136 and thence to the base of constant current source transistor 106. Thus, when a control signal is present at terminal 56, transistor 106 will be turned on thereby permitting passage of any video signal present at terminal 54 to the output stage 58.

An isolation circuit 138 may also be included, the purpose of this circuit being to deactivate all other preamplifier stages or switching circuits whenever a particular one is selected. Thus, the presence of a control signal at terminal 56 will also cause a signal of inverted polarity to be present at the collector of transistor 140, this inverted signal forcing preamplifier 60 to be turned off. Thus, only one of the switching circuits is assured of being on at any particular instant of time.

Various other components are illustrated in FIG. 5, the purpose of these components being conventional or, if not conventional described elsewhere in copending patent applications, assigned to the assignee of the instant application.

Numerous modifications of the invention will become apparent to one of ordinary skill in the art upon reading the foregoing disclosure. During such a reading it will be evident that this invention provides a unique multiple input switching bus for accomplishing the objects and advantages herein stated. Still other objects and advantages and even further modifications will become apparent from this disclosure. It is to be understood, however, that the foregoing disclosure is to be considered exemplary and not limitative, the scope of the invention being defined by the following claims.

I claim:

1. An improved crosspoint group for switching video signals some of which are applied through delay lines and some of which are not, said crosspoint group comprising:

a first switching circuit responsive to one of said video signals;

a second switching circuit responsive to another one of said input video signals;

control means for generating control signals for selecting one of said two switching circuits whereby said selected switching circuit is activated to pass the video signal applied thereto; and an output stage common to said two switching circuits for receiving the output signal from said selected switching circuit and applying it to an appropriate output terminal, the output signal from said output stage being applied through a feedback path to both of said switching circuits;

each of said switching circuits including means for adjusting the gain and frequency response of the feedback signal applied thereto to thereby provide equalization and gain adjustment of the video signal applied to said selected switching circuit.

2. Circuitry as in claim 1 where said means for adjusting the frequency response of said switching circuit includes means for adjusting separately the high and low frequency responses.

3. Circuitry as in claim 1 where each said switching circuit includes:

preamplification means responsive to its associated input video, control and feedback signal.

4. Circuitry as in claim 3 including isolation means connecting the control signal for said first switching circuit also to said second switching circuit and inverting it whereby said second switching circuit is always turned off whenever the first circuit is turned on.

5. Circuitry as in claim 3 where said preamplifier means includes a differential amplifier, one input of which is responsive to its associated video signal and the other input of which is responsive to said feedback signal.

6. Circuitry as in claim 4 where said differential amplifier includes a constant current source responsive to said control signal which turns said constant current source on to thereby turn the switching circuit on.

References Cited

UNITED STATES PATENTS

| | | | |
|---|---|---|---|
| 2,863,049 | 12/1958 | Lee at al. | 328—154 |
| 3,135,874 | 6/1964 | Lucas et al. | 328—154 |
| 3,215,854 | 11/1965 | Mayhew | 307—286 |
| 3,289,095 | 11/1966 | Johnson | 333—28 |
| 3,321,719 | 5/1967 | Kaenel | 333—28 |
| 3,375,473 | 3/1968 | Lucky | 333—28 |

DONALD D. FORRER, Primary Examiner

H. A. DIXON, Assistant Examiner

U.S. Cl. X.R.

307—243; 333—28; 328—97